United States Patent [19]

Dubner et al.

[11] 4,425,479

[45] Jan. 10, 1984

[54] APPARATUS FOR ANNUNCIATING THE COMPLETION OF A TELEPHONE CALL HOLD INTERVAL

[75] Inventors: Leon H. Dubner, 18915 N.E. 18th Ave., North Miami Beach, Fla. 33179; Gene R. Spiller, Flushing, N.Y.

[73] Assignee: Leon H. Dubner, North Miami Beach, Fla.

[21] Appl. No.: 350,747

[22] Filed: Feb. 22, 1982

[51] Int. Cl.$^3$ ...................... H04M 11/02; H04M 1/00
[52] U.S. Cl. ................................ 179/81 B; 179/99 H; 179/84 SS
[58] Field of Search ................. 179/99 H, 81 B, 81 R, 179/84 B, 84 C, 84 L, 84 SS, 27 FB, 27 FC, 1 VC, 1 MN

[56] References Cited

U.S. PATENT DOCUMENTS

| | | | |
|---|---|---|---|
| 2,506,279 | 5/1950 | Rowe | 179/84 L X |
| 3,806,665 | 4/1974 | Goldberg | 179/84 L X |
| 3,961,142 | 6/1976 | Caffine | 179/99 H X |

*Primary Examiner*—Stafford D. Schreyer
*Attorney, Agent, or Firm*—Stefan Stein

[57] ABSTRACT

An apparatus is disclosed for annunciating to an active party and a passive party the completion of a call hold interval in a telephone communication system. The apparatus comprises a voice detection circuit which senses the presence of a voice communication on the telecommunication line for actuation of an annunciation signal timer. The annunciation signal timer actuates an annunciation signal generator for a period of time referred to as the annunciation signal interval. While actuated, the annunciation signal generator produces tone bursts which are supplied to a speaker located proximate to the passive party. The tone bursts are also muted back to the active party via the telecommunication line. The apparatus of the invention as thus disclosed enables the passive party who has been put on hold by the active party to place the active party also on hold thereby eliminating the necessity of the passive party aurally monitoring the telephone. When the active party returns and speaks into the line, the apparatus senses such voice communication and produces the tone bursts, during the annunciation signal interval, which are heard by both the passive party and the ative party thereby indicating to the passive party to return to the line and indicating to the active party that the telephone line remains active. If the passive party is delayed in returning to the line, the active party may register his protest by again speaking into the telephone to initiate another series of tone bursts for a second annunciation signal interval.

10 Claims, 3 Drawing Figures

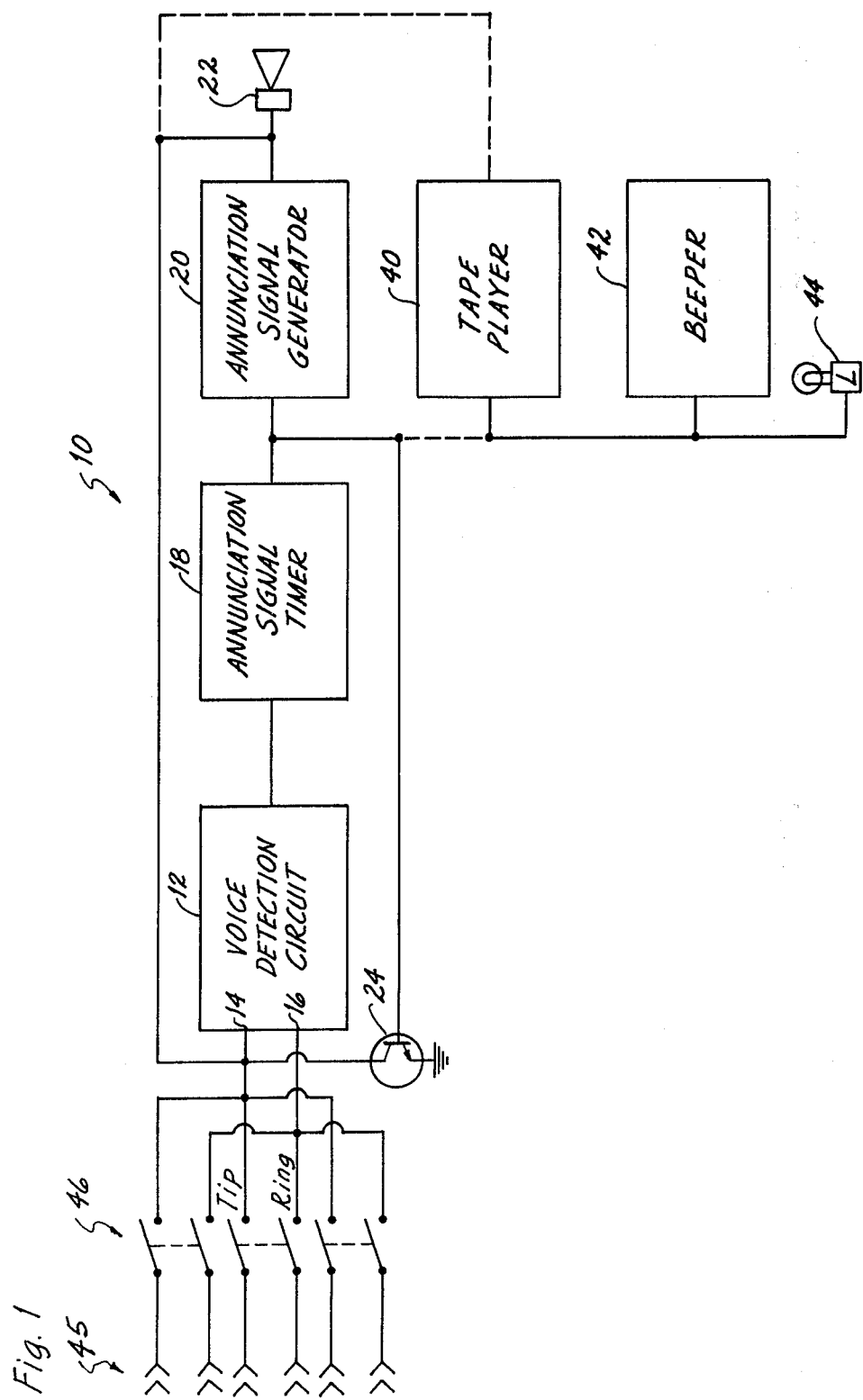

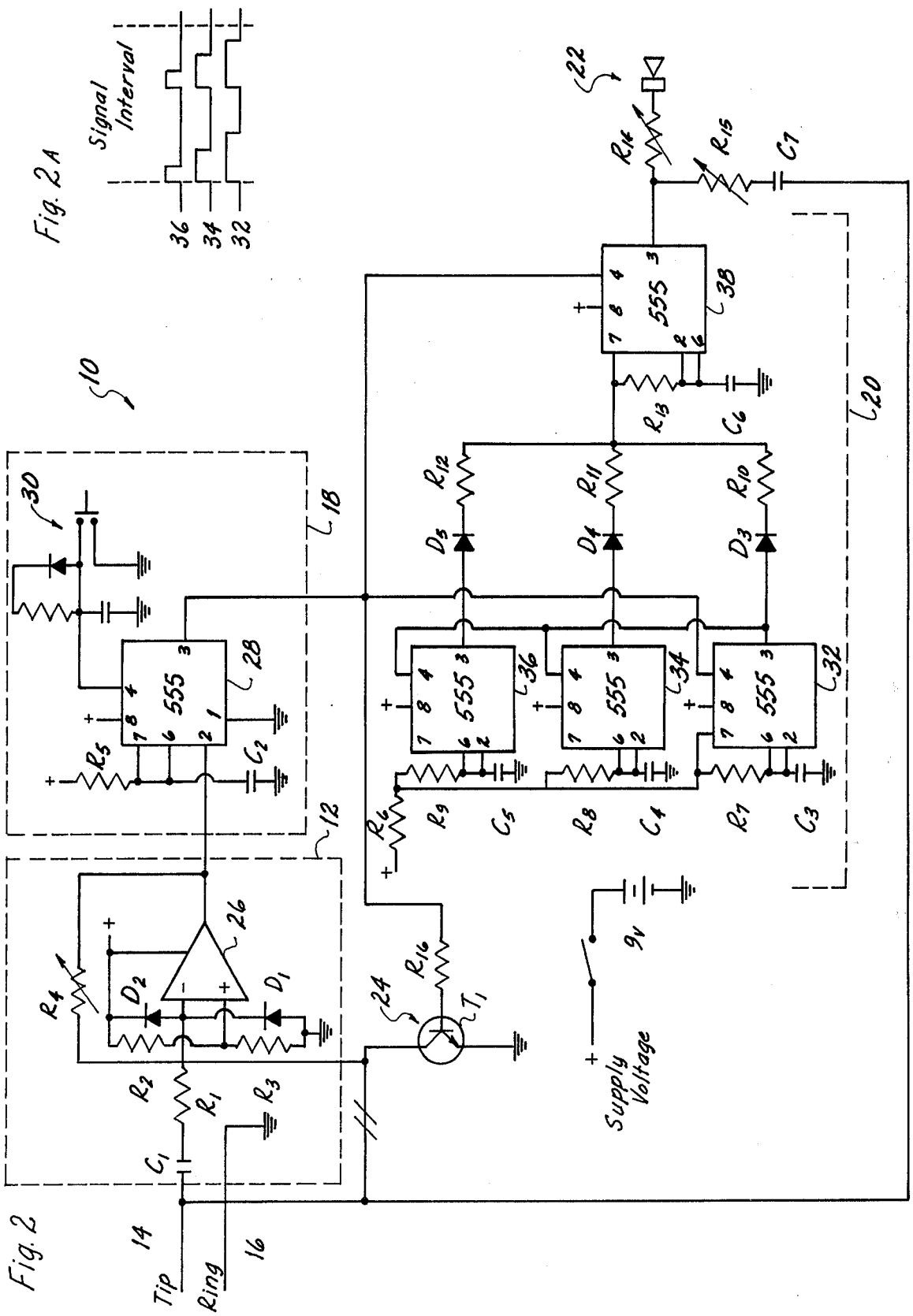

APPARATUS FOR ANNUNCIATING THE COMPLETION OF A TELEPHONE CALL HOLD INTERVAL

BACKGROUND OF THE INVENTION

This invention relates to telecommunication systems. More particularly, this invention relates to devices which may be connected to existing single line or multi-line telephone systems to announce to a "passive" party the completion of a telephone call hold interval instituted by the "active" party.

Presently, there exist many devices which may be incorporated in or retrofitted to single line or multi-line telephone systems to facilitate the ease of operating the same. Probably the most common such device in the "hold button" which permits the telephone caller to place the party to whom he is talking "on hold," thereby enabling the caller to anwser another line or another telephone without disconnecting the call which is on hold. Unfortunately, it often occurs that the telephone caller (the active party) temporarily forgets that he has placed the other party (the passive party) on hold thereby forcing the passive party to remain on the line for an uncomfortable period of time. After the passive party becomes distraught at having been put on hold for an uncomfortable period of time, the call is terminated before the active party remembers to return to the line. Obviously, in a business environment, such aggravation and loss of business cannot be tolerated.

The most common solution to the above-mentioned problems of placing a party on hold has been to "wink" the line button such that the active party will be continuously reminded that he has placed the passive party on hold. Unfortunately, a preoccupied active party quickly ignores or overlooks the winking of the line button.

Another attempt to overcome the disadvantage of having the hold capability has been to interconnect the telephone system with a source of music such that the passive party hears the music during the call hold interval. Hopefully, the soothing music distracts the passive party such that the passive party forgets how long he has been holding on the line. However, it sometimes occurs that the passive party becomes interested in a particular song or an announcement, only to be interrupted when the active party returns to the line.

Because of the aforementioned disadvantages of a call hold condition, it has been submitted to provide the passive party with a device which permits himself to place the active party on hold and to leave the active party on hold until he has returned to the line. One such device is disclosed in U.S. Pat. No. 2,506,279 issued to H. C. Rowe. The Rowe device teaches a sound actuated signal device including a housing for supporting the handset of a telephone such that, when the passive party is placed on hold, the passive party places the handset on the device. When the active party returns to the line and speaks into the line, a voice detection circuit contained within the housing senses such voice communication and actuates an indicator light indicating to the passive party that the active party has returned to the line.

U.S. Pat. No. 3,961,142 issued to Caffine teaches a very similar device which includes the added feature of automatically detecting the call hold condition. Although the Caffine device eliminates the need for manually detecting the call hold condition (placing the handset on the housing), the attendant complexities and the resulting cost of incorporating such an automatic circuit into the circuitry of a multi-line key telephone renders the Caffine device unsuitable for many applications by many owners of key telephone systems. Moreover, the Caffine device is largely unusable in that the great majority of key telephone systems are owned and seviced by public utility corporations which prohibit such devices from being incorporated into their own equipment.

Therefore it is an object of this invention to provide an apparatus which overcomes the aforementioned inadequacies of the prior art devices and provides an improvement which is a significant contribution to the telecommunication art.

Another object of this invention is to provide an apparatus for enabling a passive party who has been put on hold by an active party to place the active party also on hold and to return to the line immediately when the active party returns to the line.

Another object of this invention is to provide an apparatus for announcing to the active party that the annunciation signal has been activated and sent to the passive party.

Another object of this invention is to provide an apparatus for instituting the annunciation signal at each successive instance in which the active party makes a voice communication into his handset enabling the active party to announce to the passive party that the call hold interval, with respect to himself, has existed for an uncomfortably long period of time.

Another object of this invention is to provide an apparatus for producing a distinctive annunciation signal which is supplied to the active party that alleviates the possibility that the active party will mistakenly believe that the line has gone dead, and therefore terminate the call before the passive party has had an opportunity to return to the line.

Another object of this invention is to provide an apparatus for generating an annunciation call which would be unaffected by the presence of music on the line during the call hold interval.

The foregoing has outlined some of the more pertinent objects of the invention. These objects should be construed to be merely illustrative of some of the more prominent features and applications of the intended invention. Many other beneficial results can be attained by applying the disclosed invention in a different manner of modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjuction with the accompanying drawings.

SUMMARY OF THE INVENTION

The invention is defined by the appended claims with a specific embodiment shown in the attached drawings. For the purpose of summarizing the invention, the invention may be incorporated into a single or a multi-line telephone system to announce to the passive party when the active party has returned to the line. The apparatus contemplated by this invention comprises an electronic circuit including voice detection circuitry for detecting the presence of the voice signal of the active party. The output of the voice detection circuit is then connected to a timer to initiate the operation thereof. The output of the timer is connected to an annunciator circuit which produces the annunciation signal for a period of time determined by the timer. The annunciation signal preferably comprises a three-tone signal, each tone being of successively lower frequency. More preferably, the timer is adjusted such that annunciator signal interval is equal to three times the three-tone signal burst, such that two three-tone signal bursts, separated by a period of silence, are generated.

The output of the annunciation signal circuitry is connected back to the "tip" line of the telephone system such that the annunciation signal created by the annunciation circuitry is muted back to the active party. This precludes the possibility that the active party will mistakenly believe that the line has gone dead, or that the passive party has prematurely terminated the call, thereby urging the active party to remain on the line until the passive party has an opportunity to also come back to the line. The timer, at the completion of the two sets of the three-tone signal bursts, is automatically reset to zero, ready for being again triggered when the active party speaks into the telephone. It should be appreciated that this permits the active party to repeatedly create sets of annunciation signals which are sent to the passive party thereby enabling the active party to indicate to the passive party that the call hold interval has become excessively long, and that the active party is anxiously awaiting the passive party's return to the line.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and object of the invention, reference should be had to the following detailed description taken in connection with the accompanying drawings in which:

FIG. 1 is a block diagram of the various electrical components of the invention; and FIG. 2 is a schematic diagram of one specific embodiment of the invention.

FIG. 2A is a timing diagram for the annunciation signal generator.

Similar reference characters refer to similar parts throughtout the several views of the drawings.

DETAILED DESCRIPTION OF THE PREFERRED EMBODIMENT

FIG. 1 is a block diagram of the various components of the electronic circuitry of the invention. More particularly, the device 10 of the invention comprises a voice detection circuit 12 which is connected to the "tip" 14 and the "ring" 16 conductors of a telecommunication line. The voice detection circuit 12 senses the presence of voice communication on the tip and ring conductors 14 and 16 and actuates an annunciation timer 18. Upon actuation, the annunciation timer 18 enables an annunciation signal generator 20 for a period of time hereinafter referred to as the annunciation signal interval. During the annunciation signal interval, the annunciation signal generator 20 produces an audible signal composed of sets of three-tone bursts which are supplied to the input of a speaker 22. The annunciation signal created by the generator 20 is also fed back to the tip 14 conductor of the telecommunication line. The voice detection circuit 12 is inhibited during the annunciation signal interval by means of a transistor 24 which is driven by the output of the annunciation signal timer 18.

From the foregoing, it should be appreciated that the electronic circuitry of the invention may be connected to the tip 14 and ring 16 conductors of any telecommunication line. When the active party places the passive party on hold, the passive party, having the benefit of the device 10, is able to place the active party also on hold thereby freeing the passive party to perform useful work, such as answering another call, rather than having to aurally monitor the line until the active party has returned thereto. When the active party does return to the line and speaks into it, his voice communication is detected by the voice detection circuit 12, amplified, and supplied to the annunciation timer 18. Upon being triggered by the voice detection circuit 12, the annunciation timer 18 enables the annunciation signal generator 20 which, in turn, supplies a soothing annunciation signal to the passive party by speaker 22. The passive party is therefore notified that the active party has returned to the line and that he is ready to resume the telephone conversation.

The annunciation signal is muted back to the active party via the tip 14 conductor. The annunciation signal, being a distinctive and soothing series of three-tone bursts, immediately indicates to the active party that something is happening on the line, but the line has not gone dead. In other words, the active party will become sufficiently curious as to the source and nature of the series of tones that he will not be mistakenly misled into believing that the line has gone dead. This gives the passive party an opportunity to return to the line.

The series of tones, and the repetition thereof, continues for the duration of the annunciation signal interval, as determined by the annunciation timer 18. When the timer 28 times out, the annunciation signal generator 20 is precluded from generating the signal tones, and the voice detection circuit 12 is enabled. Accordingly, should the passive party become unduly delayed in returning to the line after the active party has returned to the line and spoken into the telephone, the active party may register his protest to the passive party by again speaking into the line and again initiating an annunciation signal for another annunciation signal interval. The repeated initiation of the annunciation signal intervals will clearly inform the passive party that the active party has been waiting on the line for an uncomfortably long period of time.

FIG. 2 is a schematic diagram of a very specific embodiment of the device 10 of the invention. More particularly, the voice detection circuit 12 of the invention comprises differential amplifier 26 which amplifies the difference between the signals applied to its noninverting and inverting inputs. The inverting input of amplifier 26 is connected through resistor $R_1$ and decoupling capacitor $C_1$ to the "tip" 14 conductor of the telecommunication line. The "ring" 16 conductor of the telecommunication line is connected to ground with respect to the various electrical components of the device 10. A voltage divider circuit comprising resistors $R_2$ and $R_3$ is connected to the noninverting input of the amplifier 26 such that one-half of the supply voltage, represented by the symbol "+," is constantly being supplied to the noninverting input. A diode $D_1$ and $D_2$ is connected between the inverting input of amplifier 26 and the supply voltage and between the inverting input and ground. Resistor $R_4$, which may comprise a potentiometer for sensitivity control, feeds back the output of the amplifier 26 to its inverting input, with the resistive value of $R_4$ divided by the resistive value of $R_1$ determining the gain of the amplifier 26. It should be appreciated that the foregoing description of the voice detection circuit 12 assures that the output thereof will remain at a high potential until a voice signal is present on the "tip" conductor, at which time the output of the amplifier 26 goes to a negative potential for the duration of the voice signal.

The annunciation timer 18 of the device 10 comprises a monostable multivibrator which operates as a one-shot pulse generator 28. More specifically, the one-shot pulse generator 28 comprises a 555 integrated circuit, well known in the trade, the trigger input (pin 2) of which is connected to the output of the amplifier 26. Upon being triggered, the output (pin 3) immediately goes high and remains high for a period of time determined by resistor $R_5$ and capacitor $C_2$; specifically, the pulse duration is equal to 1.1 times the values of $R_5$ and $C_2$. An optional reset button 30 may be connected to the reset input (pin 4) of the one-shot pulse generator 28. The reset button 30 is designed to force the reset input to ground upon actuation, thereby interrupting and terminating the annunciation signal interval.

The annunciation signal generator 28 comprises multivibrators 32, 34, and 36, and an astable multivibrator 38. The supply voltage is supplied through timing resistor $R_6$ and through timing resistors $R_7$, $R_8$, and $R_9$ to the threshold and trigger inputs (pins 6 and 2) of the multivibrators 32, 34, and 36, respectively. A timing capacitor $C_3$, $C_4$, and $C_5$ is then connected between ground and the trigger and threshold inputs of the multivibrators 32-36, respectively. The timing capacitors $C_4$ and $C_5$ are permitted to discharge only through resistors $R_8$ and $R_9$, respectively, to ground via the discharge input (pin 7) of multivibrator 32. The output of the one-shot pulse generator 28 is connected to the reset input (pin 4) of the first multivibrator 32. The ouput (pin 3) of the first multivibrator 32 is then connected to the reset input (pin 4) of each of the other two multivibrators 34 and 36.

The outputs (pin 3) of each of the three multivibrators 32, 34, and 36 are connected through diodes $D_3$, $D_4$, and $D_5$, through timing resistors $R_{10}$, $R_{11}$, and $R_{12}$, to the discharge input (pin 7) of the astable multivibrator 38. Timing resistor $R_{13}$ is connected between the discharge and trigger inputs (pins 7 and 2) of the multivibrator 38, and a timing capacitor $C_6$ is connected from ground to the threshold input (pin 6) of the multivibrator 38. Finally, the output of the one-shot pulse generator 28 is connected to the reset input (pin 4) of the multivibrator 38. The output (pin 3) of the multivibrator 38 is connected through resistor $R_{14}$, which may be a potentiometer for volume control, to the speaker 22 located proximate to the passive party.

The operation of the annunciation signal generator 28 may be summarized as follows. Upon being reset by the output of the one-shot pulse generator 28, the output of the astable multivibrator 32 immediately goes high, are remains high for a period of time determined by resistors $R_6$ and $R_7$, and capacitor $C_3$. The mulivibrators 34 and 36 are also immediately reset by the output of the first multivibrator 32 such that their output (pin 3) remains high for a period of time determined by resistors $R_6$ and $R_8$ and capacitor $C_4$, and resistors $R_6$ and $R_9$ and capacitor $C_5$, respectively.

Simultaneously with the resetting of multivibrator 32, the astable multivibrator 38 is also reset by the output of the one-shot pulse generator 28. Upon being triggered, the multivibrator 38 operates as a free running oscillator whose frequency is dependent upon the rate in which capacitor $C_6$ charges via resistors $R_{10}$, $R_{11}$, $R_{12}$ and $R_{13}$. Specifically, the output frequency of multivibrator 38 is dependent upon the resistive value of timing resistors $R_{10}$, $R_{11}$, and $R_{12}$ when the output (pin 3) of the respective multivibrators 32, 34, and 36 are high. When the output (pin 3) of more than one multivibrator is high, the respective timing resistors $R_{10}$, $R_{11}$, and $R_{12}$ are connected in parallel, thereby changing the output frequency of the multivibrator 38. Accordingly, the output frequency of the multivibrator 38 may comprise any series of tones of different frequencies which are supplied to the speaker 22.

The output of the multivibrator 38 is connected through resistor $R_{15}$, which may be a potentiometer for volume control, and through decoupling capacitor $C_7$ to the tip conductor 14. This permits the annunciation signal which is supplied to the speaker 22 to also be muted back to the active party to indicate to the active party that the line is still active.

The output of the one-shot pulse generator 28 is connected through resistor $R_{16}$ to the base of transistor $T_1$, the collector of which is connected to the inverting input of the differential amplifier 26 and the emitter which is connected to ground. Upon being actuated by the output of the pulse generator 28, the inverting input of the differential amplifier 26 is driven to ground by transistor $T_1$ thereby inhibiting the operation of the voice detection circuit 12. Upon completion of the annunciation signal interval, as determined by pulse generator 28, the transistor $T_1$ is turned "off" thereby rendering the voice detection circuit 12 to be once again operable.

In a most specific embodiment of the device 10, the electrical components thereof are selected to have the values listed in the following table:

| | | |
|---|---|---|
| $C_1 = 0.33$ | $R_1 = 10K$ | $R_9 = 390K$ |
| $C_2 = 10$ | $R_2 = 10K$ | $R_{10} = 47K$ |
| $C_3 = 2.2$ | $R_3 = 10K$ | $R_{11} = 91K$ |
| $C_4 = 2.2$ | $R_4 = 100K$ | $R_{12} = 82K$ |
| $C_5 = 2.2$ | $R_5 = 1M$ | $R_{13} = 20K$ |
| $C_6 = 0.022$ | $R_6 = 1K$ | $R_{14} = 220$ |
| $C_7 = 0.1$ | $R_7 = 2M$ | $R_{15} = 6.8K$ |
| | $R_8 = 1M$ | $R_{16} = 10K$ |

All resistive values are in ohms and all capacitive values are in microfarads.

With the foregoing values of the electrical components, the one-shot pulse generator 28 includes an "on" time of approximately 10 seconds, which means that the annunciation signal interval is 10 seconds. The frequency of the astable multivibrator 32 is approximately six seconds. Accordingly, during each signal interval the output (pin 3) of the multivibrator 32 will go high for approximately three seconds, go low for three seconds, go high again for three seconds, and then go low. Simultaneously with the output of multivibrator 32 going high, the multivibrators 34 and 36 are reset thereby causing their output (pin 3) to also go high and remain high during the charging of their timing capacitors $C_4$ and $C_5$, which is equal to approximately two and one second(s), respectively, and then go low. The outputs (pin 3) of the multivibrators 34 and 36 are prevented from again going high until the multivibrators 34 and 36 are again reset by multivibrator 32 since the timing capacitors $C_4$ and $C_5$ can only discharge through the discharge input (pin 7) of multivibrator 32. Accordingly, as shown in the timing diagram of FIG. 2a, the outputs of the multivibrators 32, 34, and 36 go high for a period of three seconds, two seconds, and one second, respectively, remain low for an overall period of six seconds, and then go high again for a period of three seconds, two seconds, and one second, respectively. During the period of time when the outputs are all high, timing resistors $R_{10}$, $R_{11}$, and $R_{12}$ are in effect connected in parallel thereby including a parallel resistance of 22,500 ohms, resulting in an output frequency of multivibrator 38 of 1,050 hertz. Similarly, with only the outputs of multivibrators 32 and 34 high, resistors $R_{10}$ and $R_{11}$ are connected in parallel thereby including a parallel resistance of 31,000 ohms, resulting in an output frequency of 920 hertz. Finally, with only the output of multivibrator 32 being high, the output frequency of multivibrator 38 is 750 hertz. This results in a three-tone burst, each tone lasting for approximately one second, and the burst repeating itself every three seconds. With the annunciation signal interval set to equal approximately 10 seconds, it is seen that only two three-tone signal bursts will be generated. These three-tone signal bursts are then supplied to the speaker 22 and to the tip 14 conductor of the telephone line.

A more detailed explanation of each of the 555 integrated circuits can be found in the book entitled "TTL Cookbook" published by Howard W. Sams & Co., Inc. of New York, N.Y., the disclosure of which is hereby incorporated by reference.

Returning to FIG. 1, it is seen that the output of the annunciation signal timer 18 may alternatively be connected to a tape player 40. Upon being actuated by the timer 18, the tape recorder supplies a prerecorded message to the tip 14 conductor of the telephone line. The message would indicate to the active party that the passive party is returning to the line. The message may be continuous such that the message is continually repeated until the passive party returns to the line.

The output of the annunciation timer 18 may also be connected to a beeper 42 and to a light 44 which would sound and light, respectively, upon being actuated by the timer 18. The beeper 42 and the light 44 is positioned proximate to the passive party such that the passive party will be notified that the active party has returned to the line.

As noted earlier, the device 10 may be connected to a single or a multi-line telephone system. As shown in FIG. 1, the device 10 may be connected to a multi-line telephone system by means of a two pole switch 46, such as multi-position rotary switch, which manually connects the device 10 to the tip and ring conductors of one of the telephone lines. The device 10 of the invention may be easily connected to a telephone of a multi-line key telephone system. Specifically, the multi-position switch 46 may be hand wired to a bridging adaptor, represented by numeral 48, for connection in line between the existing male and female 25 pair connectors of the telephone. Accordingly, it should be appreciated that the bridging adaptor 48 enables a consumer of ordinary expertise to connect the device 10 to the telephone of a key telephone system without the need for any special tools or equipment.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described:

What is claimed is:

1. An apparatus for annunciating the completion of a call hold interval in a telephone communication system to an active party and a passive party, said apparatus comprising in combination:

voice detection circuit means responsive to the presence of a voice signal on the telephone communication line;

an annunciation signal timer;

means for connecting said annunciation timer to said voice detection circuit such that said voice detection circuit actuates said annunciation timer when said voice detection circuit senses the presence of a voice signal on the telecommunication line; and means for indicating to the active party and to the passive party when said annunciation signal timer has been actuated by said voice detection circuit thereby notifying the passive party that the active party has returned to the line and indicating to the active party that the telecommunication line is still active.

2. The apparatus as set forth in claim 1, wherein said indication means comprises an acoustical device, located proximate to the passive party, which emits an audible signal upon actuation by said annunciation signal timer.

3. The apparatus as set forth in claim 1, wherein said indication means comprises a tape player means which supplies a prerecorded message to the active party upon actuation by said annunciation signal timer.

4. the apparatus as set forth in claim 1, wherein said indication means comprises an annunciation signal generator which, upon being actuated by said annunciation signal timer, supplies a signal to a speaker means for audibly indicating to the passive party that the active party has returned to the line and to the telecommunication line to indicate to the active party that the telecommunication line is active.

5. The apparatus as set forth in claim 4, wherein said annunciation signal timer includes a monostable multivibrator whose output triggers said annunciation signal generator during a predetermined annunciation signal interval such that said annunciation signal timer may be retriggered after the expiration of the first annunciation signal interval thereby permitting the active party to indicate to the passive party that the active party has returned to the line and is awaiting the passive party's return to the line.

6. The apparatus as set forth in claim 5, wherein said annunciation signal generator comprises means for producing at least one audible tone which is supplied to said speaker means and to the telecommunication line.

7. The apparatus as set forth in claim 5, wherein said annunciation signal generator comprises means for producing three-tone bursts which are supplied to said speaker means and to the telecommunication line during the annunciation signal interval.

8. The apparatus as set forth in claim 5, further including means for deactuating said voice detection circuit during said annunciation signal interval.

9. The apparatus as set forth in claim 1, further including a switch means for manually connecting said voice detection circuit to a telecommunication line of a multi-line system.

10. The apparatus as set forth in claim 1, further including a bridging adaptor means and a multi-position switch means which enable the apparatus to be connected in line to a multi-line telephone communication system and which enable said voice detection circuit means to be manually connected to one of the telecommunication lines of the multi-line telephone communication system.

* * * * *